United States Patent
Lan (10) Patent No.: US 7,808,481 B2
(45) Date of Patent: Oct. 5, 2010

(54) OPTICAL POINTING DEVICE

(75) Inventor: Jeng-Fang Lan, Hsinchu Hsieh (TW)

(73) Assignee: PixArt Imaging Incorporation, Hsin-Chu (TW)

( * ) Notice: Subject to any disclaimer, the term of this patent is extended or adjusted under 35 U.S.C. 154(b) by 833 days.

(21) Appl. No.: 11/269,779

(22) Filed: Nov. 7, 2005

(65) Prior Publication Data

US 2006/0221352 A1 Oct. 5, 2006

(30) Foreign Application Priority Data

Apr. 4, 2005 (TW) .............................. 94110716 A (51) Int. Cl.
*G06F 3/033* (2006.01)
(52) U.S. Cl. ....................................... 345/163; 345/166
(58) Field of Classification Search ................ 345/163, 345/166, 905; 250/221
See application file for complete search history.

(56) References Cited

U.S. PATENT DOCUMENTS

| | | | | |
|---|---|---|---|---|
| 4,857,903 | A * | 8/1989 | Zalenski | 345/166 |
| 6,501,460 | B1 * | 12/2002 | Paik et al. | 345/163 |
| 7,050,043 | B2 * | 5/2006 | Huang et al. | 345/166 |

* cited by examiner

*Primary Examiner*—Amare Mengistu
*Assistant Examiner*—Insa Sadio
(74) *Attorney, Agent, or Firm*—Tung & Associates (57) ABSTRACT

An optical pointing device, which is to be disposed on a working surface, includes a casing, a light source, a light sensor, and an obstructing member. The casing has a light transmissible portion. The light source is mounted in the casing, and emits light that is directed through the light transmissible portion of the casing and that is reflected by the working surface back into the casing through the light transmissible portion. The light sensor is mounted in the casing, and detects the light reflected by the working surface. The obstructing member is disposed in the casing, and is capable of preventing the light sensor from detecting the light reflected by the working surface when the casing is moved beyond a predetermined distance above the working surface.

6 Claims, 8 Drawing Sheets

OPTICAL POINTING DEVICE

CROSS-REFERENCE TO RELATED APPLICATION

This application claims priority of Taiwanese application no. 094110716, filed on Apr. 4, 2005.

BACKGROUND OF THE INVENTION

1. Field of the Invention

This invention relates to an optical pointing device, more particularly to an optical pointing device that employs laser technology.

2. Description of the Related Art

Figure 1:
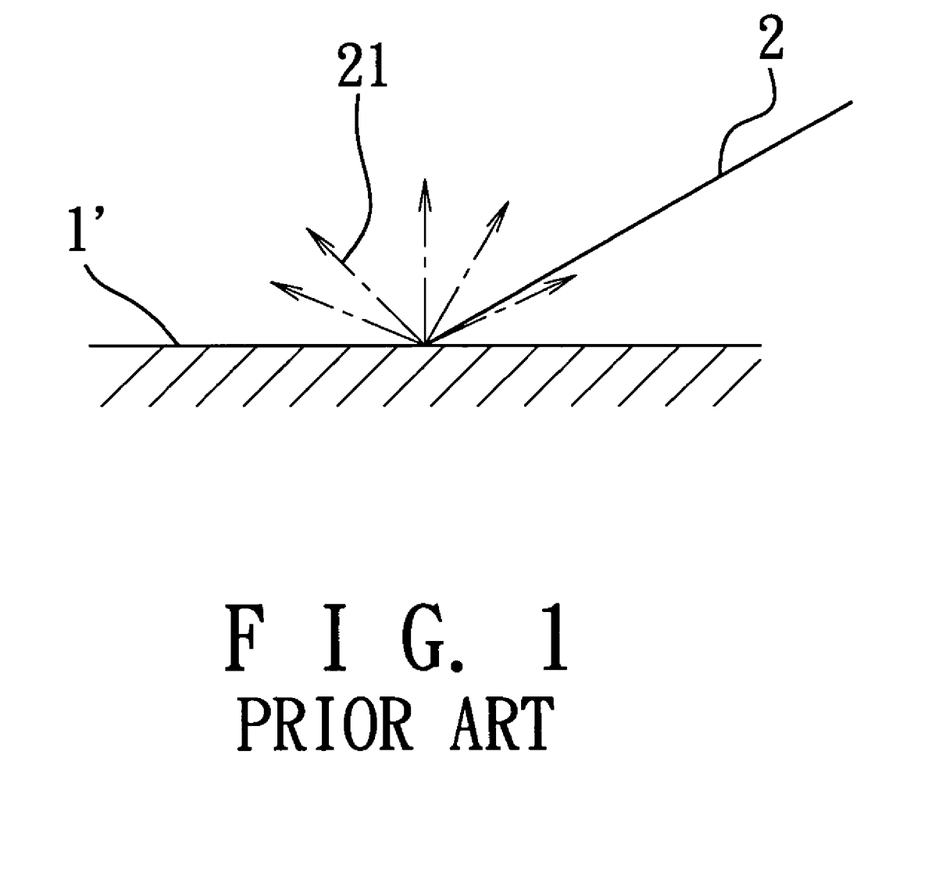
FIG. 1 illustrates scattering of light from a surface.

Speckles arise when a coherent light 2, such as a laser beam, is scattered from a surface 1', as illustrated in FIG. 1. Accordingly, when the light 2 is scattered from different parts of the surface 1', different speckle patterns 21 are produced.

Figure 2:
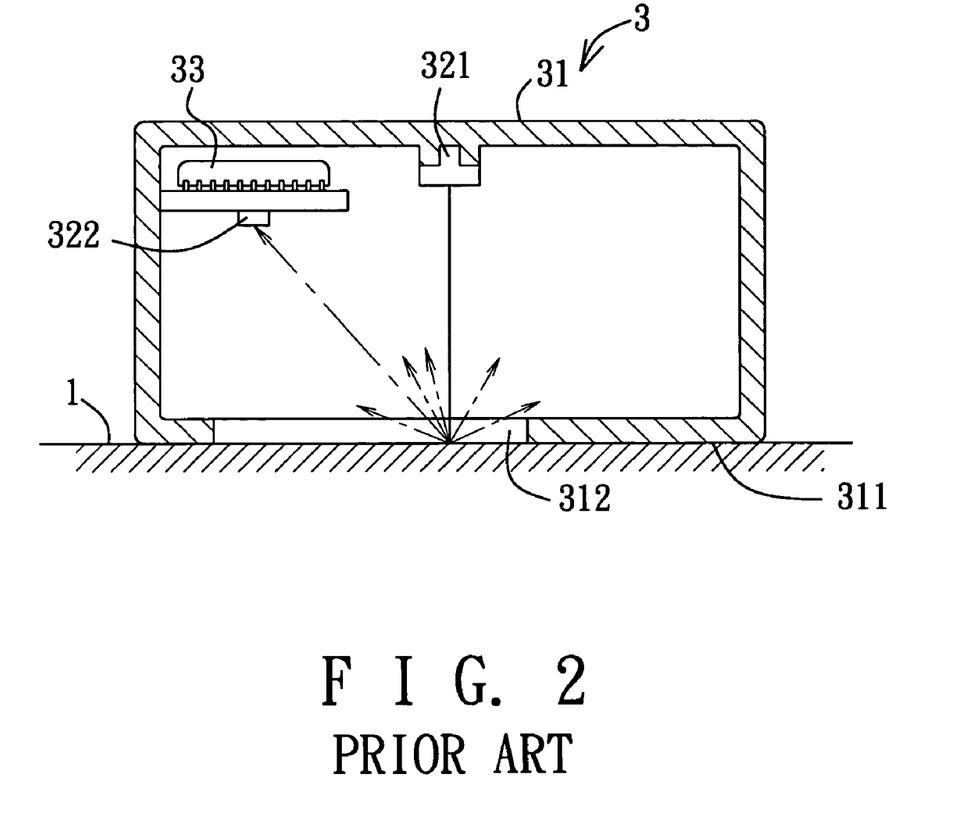
FIG. 2 is a schematic partly sectional view to illustrate a conventional optical mouse when disposed on the working surface.

Referring to FIG. 2, a conventional optical mouse 3 is shown to include a casing 31, a laser light source 321, a laser light sensor 322, and a processing unit 33. The casing 31 includes a bottom part 311 that is formed with an opening 312. The light source 321 is mounted in the casing 31, and emits light that is directed through the opening 312 in the bottom part 311 of the casing 31, that is incident on a working surface 1, and that is subsequently reflected by the working surface 1 back into the casing 31 through the opening 312. The light sensor 322 is mounted in the casing 31, and detects the light reflected by the working surface 1. The processing unit 33 is mounted in the casing 31, is coupled to the light sensor 322, and is operable so as to determine displacement of the casing 31 relative to the working surface 1 based on the reflected light detected by the light sensor 322 when the casing 31 is moved along the working surface 1. The processing unit 33 generates a control signal that corresponds to the relative displacement of the casing 31 determined thereby and that can be used to control a cursor (not shown) on a computer screen (not shown).

Figure 3:
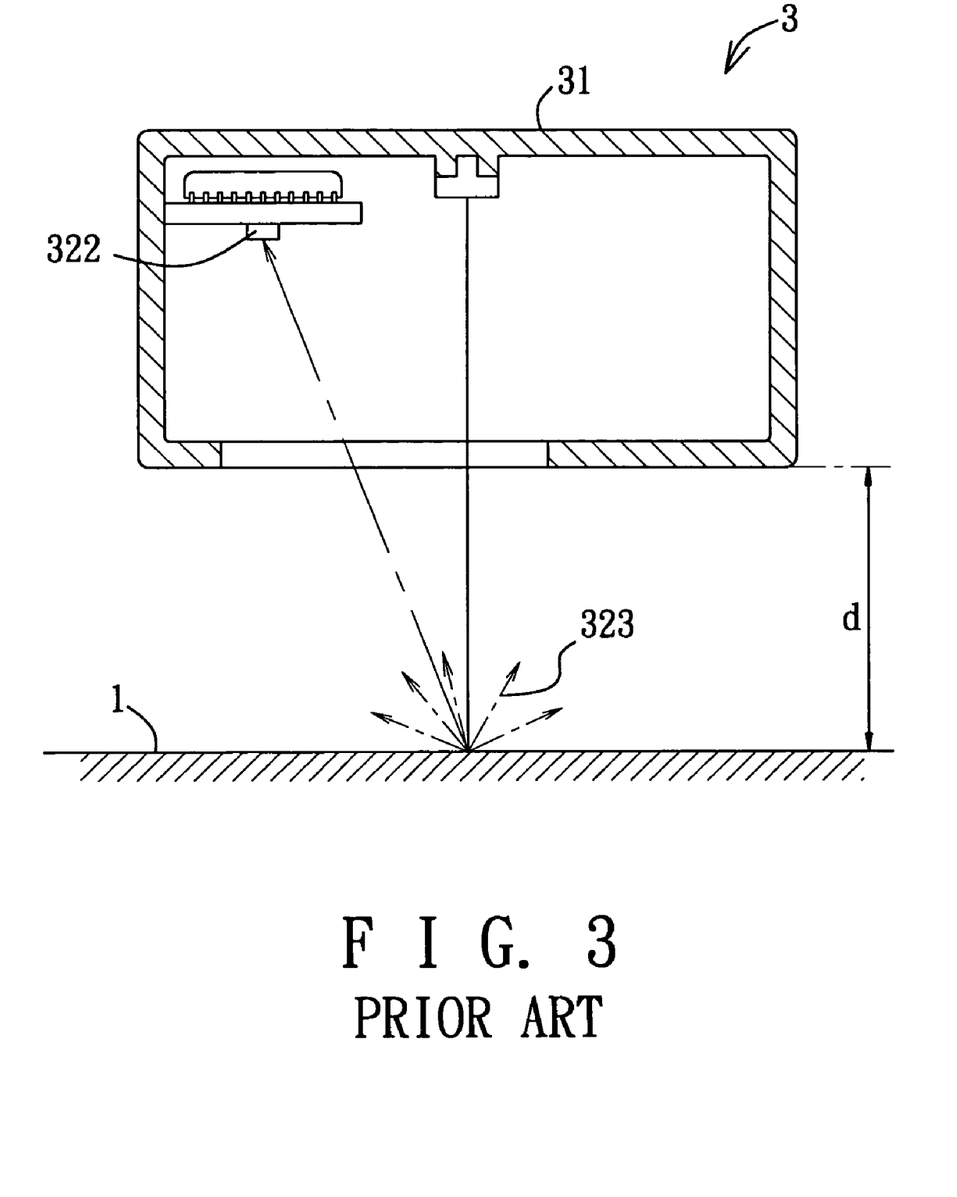
FIG. 3 is a schematic partly sectional view to illustrate a conventional optical mouse when disposed at a distance from the working surface.

The aforementioned conventional optical mouse 3 is disadvantageous in that when the casing 31 is moved a distance (d) away from the working surface 1, as illustrated in FIG. 3, since the intensity of the light reflected by the working surface 1 does not fade easily in contrast to light produced by non-coherent light sources, the light sensor 322 is still able to detect speckle patterns 323 corresponding to the reflected light, thereby resulting in unintentional movements of the cursor.

SUMMARY OF THE INVENTION

Therefore, the object of the present invention is to provide an optical pointing device that can overcome the aforesaid drawback of the prior art.

According to the present invention, an optical pointing device, which is to be disposed on a working surface, comprises a casing, a light source, a light sensor, a processing unit, and an obstructing member. The casing has a side, and a light transmissible portion that is provided on the side of the casing and that faces the working surface. The light source is mounted in the casing, and emits light that is directed through the light transmissible portion of the casing and that is subsequently reflected by the working surface back into the casing through the light transmissible portion. The light sensor is mounted in the casing, and detects the light reflected by the working surface. The processing unit is coupled to the light sensor, and is operable so as to determine displacement of the casing relative to the working surface based on the reflected light detected by the light sensor when the casing is moved along the working surface. The obstructing member is disposed in the casing, and is capable of preventing the light sensor from detecting the light reflected by the working surface when the casing is moved beyond a predetermined distance away from the working surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 4:
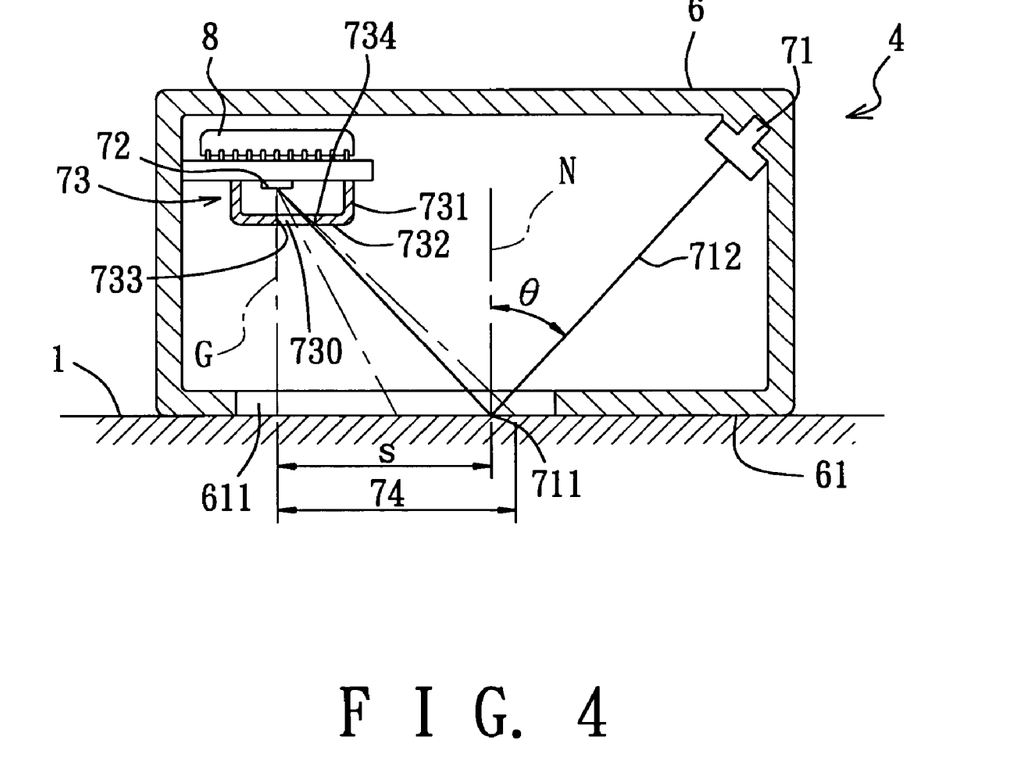
FIG. 4 is a schematic partly sectional view of the first preferred embodiment of an optical pointing device according to the present invention.

Referring to FIG. 4, the first preferred embodiment of an optical pointing device 4 according to this invention is shown to include a casing 6, a light source 71, a light sensor 72, a processing unit 8, and an obstructing member 73.

In this embodiment, the optical pointing device 4, such as an optical mouse that employs laser technology, is operable so as to generate a control signal that is transmitted to an operating system of a computing device (not shown) and that controls movement of a cursor on a computer screen (not shown) of the computing device, in a manner well known in art.

The optical pointing device 4 is suitable for use on a working surface 1, such as a table or a mouse pad.

The casing 6 includes a bottom side 61 that is provided with a light transmissible portion 611. In this embodiment, the light transmissible portion 611 is formed with an opening.

The light source 71 is mounted in the casing 6, and emits light 712 which is directed through the opening 611 in the bottom side 61 of the casing 6, which is incident on the working surface 1, and which is subsequently reflected by the working surface 1 back into the casing 6 through the opening 611. In this embodiment, the light source 71 is a semiconductor laser source. It is noted that the light reflected by the working surface 1 produces a speckle pattern corresponding to the profile of the reflecting part of the working surface 1.

The light sensor 72 is mounted in the casing 6, detects the light that is reflected by the working surface 1, and defines a geometric center. The light sensor 72 is disposed in the casing 6 such that an imaginary line (G) passing through the geometric center thereof is perpendicular to the working surface 1.

The processing unit 8 is mounted in the casing 6, is coupled to the light sensor 72, and is operable so as to determine displacement of the casing 6 relative to the working surface 1 based on the reflected light detected by the light sensor 72 when the casing 6 is moved along the working surface 1. That is, as the casing 6 is moved along the working surface 1, the reflected light produces different speckle patterns. The processing unit 8 determines the relative displacement of the casing 6 by performing calculations on the speckle patterns. It should be apparent to those skilled in the art that the calculations may be performed in various ways. Moreover, it is noted that the control signal generated by the optical pointing device 4 corresponds to the relative displacement of the casing 6 as determined by the processing unit 8.

The obstructing member 73 is disposed in the casing 6, and is capable of preventing the light sensor 72 from detecting the light reflected by the working surface 1 when the casing 6 is moved beyond a predetermined distance away from the working surface 1, in a manner to be described hereinafter.

The light sensor 72 and the light source 71 are spaced apart from each other along a horizontal direction transverse to the imaginary line (G) that extends from the geometric center of the light sensor 72 to the working surface 1.

The light source 71 is disposed in the casing 6 such that the light 712 emitted thereby forms an incident angle ($\theta$) with a line (N) normal to the working surface 1.

In this embodiment, the obstructing member 73 includes a base wall 732, and a surrounding wall 731 that extends from a periphery of the base wall 732 and that surrounds the light sensor 72. The base wall 732 of the obstructing member 73 is formed with a hole 730 therethrough. The hole 730 is defined by a hole-defining periphery that has proximate and distal portions 734, 733 respectively proximate and distal relative to the light source 71 along the horizontal direction. In this embodiment, the obstructing member 73 is disposed in the casing 6 such that the distal portion 733 of the hole-defining periphery of the hole 730 in the base wall 732 is aligned with the geometric center of the light sensor 72. It is noted that the area 74 of the working surfaces that is within the coverage of the light sensor 72 is restricted by the size of the hole 730 in the base wall 732 of the obstructing member 73, as well as the opening 611 in the bottom side 61 of the casing 6.

Figure 5:
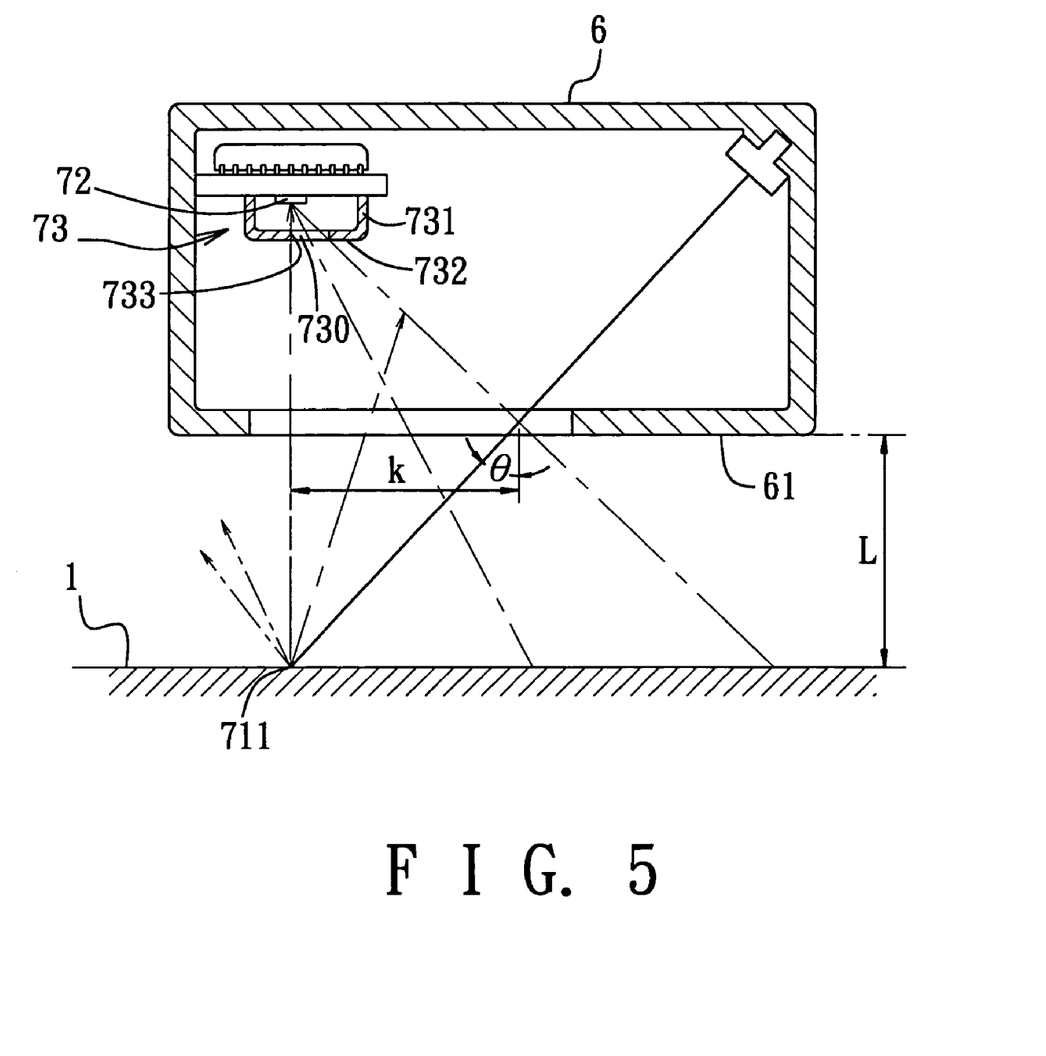
FIG. 5 is a schematic partly sectional view to illustrate the first preferred embodiment when disposed at a predetermined distance above a working surface.
Figure 6:
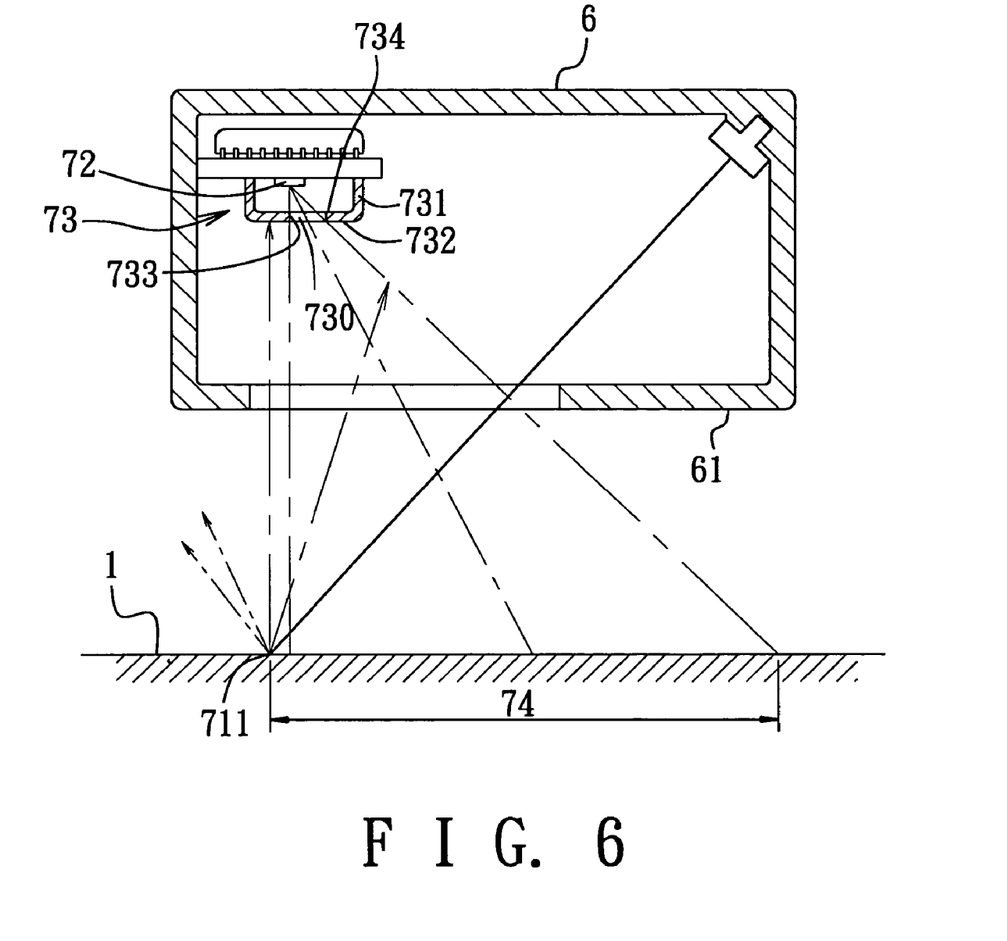
FIG. 6 is a schematic partly sectional view to illustrate the first preferred embodiment when disposed beyond the predetermined distanced above the working surface.

In operation, at an initial position, as illustrated in FIG. 4, the bottom side 61 of the casing 6 is disposed on the working surface 1. At this position, the incident light 711 is between the light source 71 and the light sensor 72 at a distance (s) from the geometric center of the light sensor 72. At this time, with further reference to FIG. 5, when the casing 6 is moved such that the bottom side 61 of the casing 6 is at the predetermined distance (L) above the working surface 1, the incident light 711 is aligned with the geometric center of the light sensor 72. Since the geometric center of the light sensor 72 is also aligned with the distal portion 733 of the hole-defining periphery of the hole 730 in the base wall 732 of the obstructing member 73, the light sensor 72 is partly obstructed by the base wall 732 from the reflected light. At this time, with further reference to FIG. 6, when the casing 6 is moved such that the bottom side 61 of the casing 6 is beyond the predetermined distance (L) (see FIG. 5) above the working surface 1, the light sensor 72 is totally obstructed by the base wall 732 from the reflected light. Accordingly, by virtue of the obstructing member 73, unintentional movements of the cursor can be prevented when the casing 6 is moved beyond the predetermined distance (L) above the working surface 1.

Figure 7:
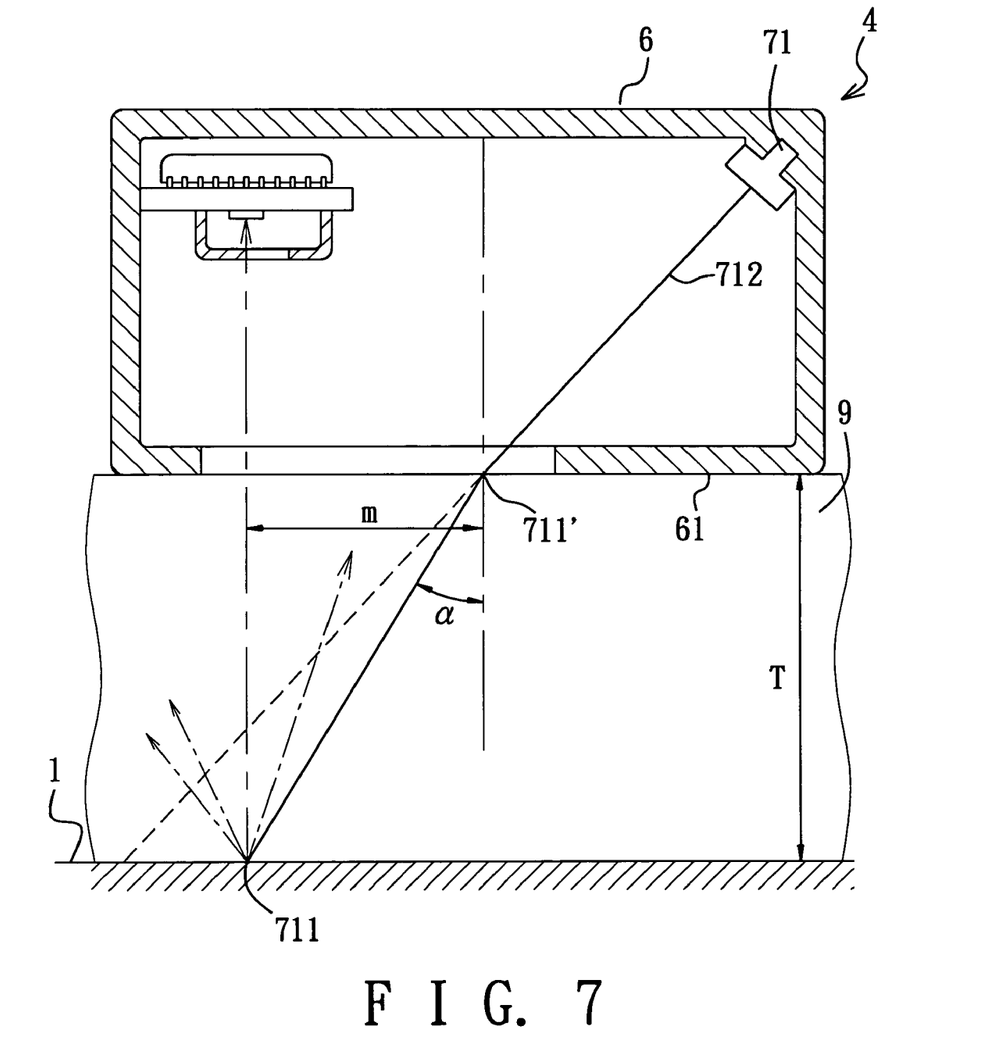
FIG. 7 is a schematic partly sectional view to illustrate the first preferred embodiment when disposed on a light transmissible material.

The displacement (k) of the incident light 711 relative to its initial position when the bottom side 61 of the casing 6 is at the predetermined distance (L) above the working surface 1 may be calculated from the formula, $k=L(\tan \theta)$ However, it is worth noting that, as illustrated in FIG. 7, when the optical pointing device 4 is disposed on top of a light transmissible material 9, such as glass, that is placed on the working surface 1, the light 712 emitted by the light source 71 is refracted as it passes into the material 9 prior to being incident on the working surface 1. As such, when the bottom side 61 of the casing 6 is disposed on the material 9, the distance (m) between an incident light 711' on a working surface of the material 9 and the incident light 711 on the working surface 1 may be calculated from the formula, $m=T(\tan \alpha)$ where T is the thickness of the material 9, and $\alpha$ is the angle of refraction.

Figure 8:
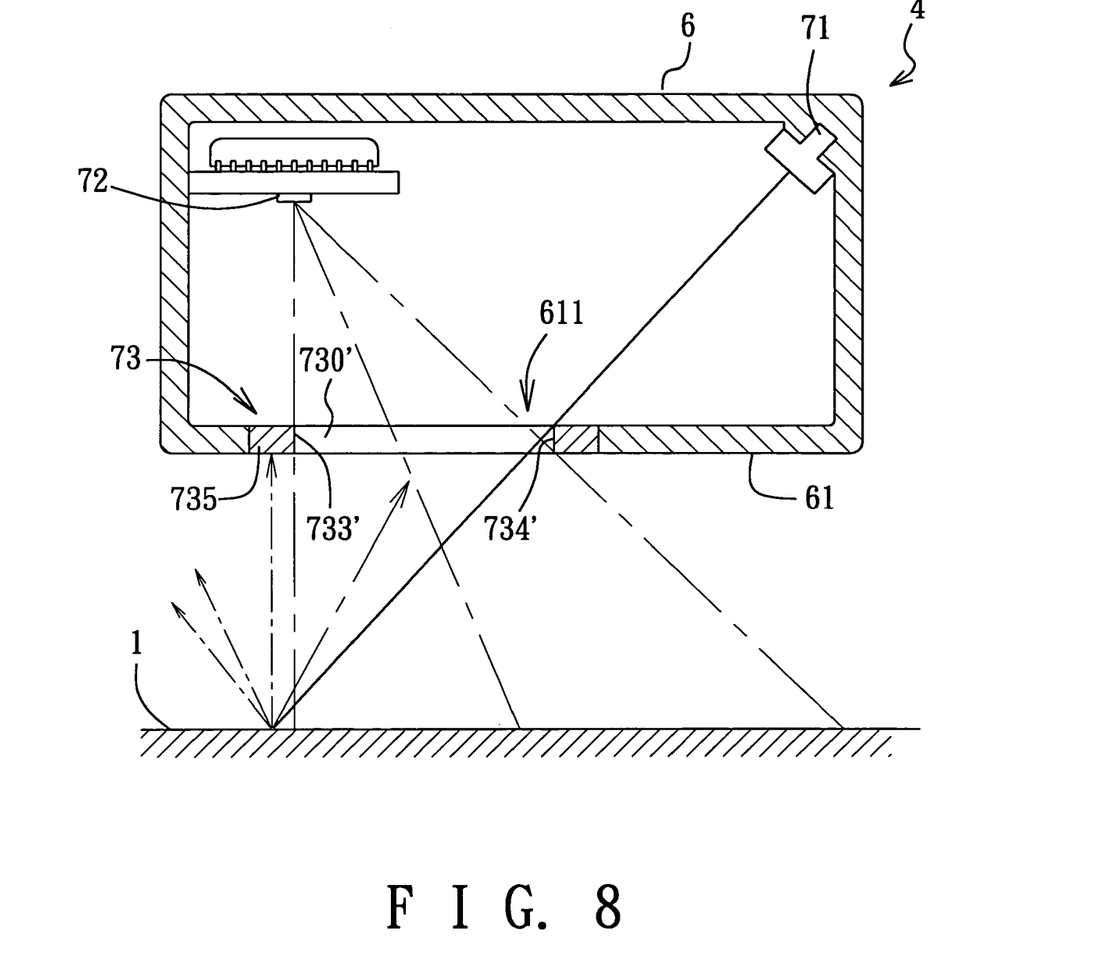
FIG. 8 is a schematic partly sectional view of the second preferred embodiment of an optical pointing device according to the present invention.

FIG. 8 illustrates the second preferred embodiment of an optical pointing device 4 according to this invention. When compared with the previous embodiment, the obstructing member 73 includes a thin piece 735 that is formed with a hole 730' therethrough. The hole 730' is defined by a hole-defining periphery that has proximate and distal portions 734', 733' respectively proximate and distal relative to the light source 71 along the horizontal direction. The thin piece 735 of the obstructing member 73 is disposed in the opening 611 in the bottom side 61 of the casing 6 such that the distal portion 733' of the hole-defining periphery of the hole 730' in the thin piece 735 of the obstructing member 73 is aligned with the geometric center of the light sensor 72. The opening 611 in the bottom side 61 of the casing 6 is defined by a periphery. In this embodiment, the thin piece 735 of the obstructing member 73 is glued to the periphery of the opening 611 in the bottom side 61 of the casing 6. In an alternative embodiment, the thin piece 735 of the obstructing member 73 is annular. The periphery of the opening 611 in the bottom side 61 of the casing 6 is formed with an inner thread. The thin piece 735 of the obstructing member 73 is formed with an outer thread that engages threadedly the periphery of the opening 611. It is further noted that the thin piece 735 of the obstructing member 73 may be formed integrally with the bottom side 61 of the casing 6.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical pointing device adapted to be disposed on a working surface, comprising:
   a casing having a side, and a first light transmissible portion that is provided on said side of said casing and that faces the working surface;
   a light source mounted in said casing, and adapted to emit coherent light that is directed through said first light transmissible portion of said casing and that is subsequently reflected by the working surface back into said casing through said first light transmissible portion;

a light sensor mounted in said casing, and adapted to detect the light reflected by the working surface, wherein said light sensor defines a geometric center;

a processing unit coupled to said light sensor, and operable so as to determine displacement of said casing relative to the working surface based on the reflected light detected by said light sensor when said casing is moved along the working surface; and an obstructing member disposed in said casing, and capable of preventing said light sensor from detecting the light reflected by the working surface when said casing is moved beyond a predetermined distance away from the working surface, wherein said obstructing member is formed with a second light transmissible portion which has a center, and wherein an offset is provided between said center of said second light-transmissible portion and said geometric center of said light sensor, whereby when said casing is moved beyond a predetermined distance away from the working surface, said offset prevents the light emitted from the light source and reflected by the working surface from reaching said light sensor.

2. The optical pointing device as claimed in claim 1, wherein said first light transmissible portion is formed with an opening.

3. The optical pointing device as claimed in claim 1, wherein said light sensor is disposed in said casing such that an imaginary line passing through the geometric center thereof is perpendicular to the working surface, said light source being disposed in said casing such that the light emitted thereby forms an incident angle with a line normal to the working surface.

4. The optical pointing device as claimed in claim 3, wherein said light sensor is spaced apart from said light source in a horizontal direction transverse to the imaginary line that extends from the geometric center of said light sensor to the working surface, said second light transmissible portion of said obstructing member being defined by a periphery that has proximate and distal portions respectively proximate and distal relative to said light source along the horizontal direction, said obstructing member being disposed in said casing such that said distal portion of said periphery is aligned with the geometric center of said light sensor.

5. The optical pointing device as claimed in claim 3, wherein said light sensor is spaced apart from said light source in a horizontal direction transverse to the imaginary line that extends from the geometric center of said light sensor to the working surface, said second light transmissible portion of said obstructing member being defined by a periphery that has proximate and distal portions respectively proximate and distal relative to said light source along the horizontal direction, said obstructing member being disposed in said opening of said casing such that said distal portion of said periphery is aligned with the geometric center of said light sensor.

6. The optical pointing device as claimed in claim 5, wherein said casing and said obstructing member are connected integrally.

* * * * *